United States Patent
Wick et al.

(10) Patent No.: US 11,521,069 B2
(45) Date of Patent: Dec. 6, 2022

(54) WHEN OUTPUT UNITS MUST OBEY HARD CONSTRAINTS

(71) Applicant: Oracle International Corporation, Redwood Shores, CA (US)

(72) Inventors: Michael Wick, Medford, MA (US); Jean-Baptiste Tristan, Lexington, MA (US); Jay Yoon Lee, Pittsburgh, PA (US)

(73) Assignee: Oracle International Corporation, Redwood Shores, CA (US)

( * ) Notice: Subject to any disclaimer, the term of this patent is extended or adjusted under 35 U.S.C. 154(b) by 1097 days.

(21) Appl. No.: 15/450,933

(22) Filed: Mar. 6, 2017

(65) Prior Publication Data

US 2018/0121807 A1    May 3, 2018

Related U.S. Application Data

(60) Provisional application No. 62/415,271, filed on Oct. 31, 2016.

(51) Int. Cl.
| | | |
|---|---|---|
| *G06N 3/08* | (2006.01) | |
| *G06N 3/04* | (2006.01) | |
| *G06N 5/00* | (2006.01) | |

(52) U.S. Cl.
CPC ........... *G06N 3/084* (2013.01); *G06N 3/0445* (2013.01); *G06N 5/003* (2013.01)

(58) Field of Classification Search
CPC ....... G06N 3/084; G06N 3/0445; G06N 5/003
See application file for complete search history.

(56) References Cited

U.S. PATENT DOCUMENTS

| | | | | |
|---|---|---|---|---|
| 2004/0034505 A1* | 2/2004 | Kimble | ................... | G06F 3/017 |
| | | | | 702/182 |
| 2005/0149463 A1* | 7/2005 | Bolt | ........................ | G06N 3/08 |
| | | | | 706/20 |
| 2018/0086222 A1* | 3/2018 | Juang | ................... | B60L 11/1861 |

OTHER PUBLICATIONS

Rumelhart, David E., Geoffrey E. Hinton, and Ronald J. Williams. "Learning representations by back-propagating errors." nature 323. 6088 (1986): 533-536. (Year: 1986).*

(Continued)

*Primary Examiner* — Michael J Huntley
*Assistant Examiner* — Sehwan Kim
(74) *Attorney, Agent, or Firm* — Hickman Becker Bingham Ledesma LLP (57) ABSTRACT

Embodiments employ an inference method for neural networks that enforces deterministic constraints on outputs without performing post-processing or expensive discrete search over the feasible space. Instead, for each input, the continuous weights are nudged until the network's unconstrained inference procedure generates an output that satisfies the constraints. This is achieved by expressing the hard constraints as an optimization problem over the continuous weights and employing backpropagation to change the weights of the network. Embodiments optimize over the energy of the violating outputs; since the weights directly determine the output through the energy, embodiments are able to manipulate the unconstrained inference procedure to produce outputs that conform to global constraints.

20 Claims, 4 Drawing Sheets

(56) References Cited

OTHER PUBLICATIONS

Jeong, Kyu-Hwa, Jian-Wu Xu, and Jose C. Principe. "An information theoretic approach to adaptive system training using unlabeled data." Proceedings. 2005 IEEE International Joint Conference on Neural Networks, 2005 . . . vol. 1. IEEE, 2005. (Year: 2005).*

Jeong, Kyu-Hwa, et al. "A new classifier based on information theoretic learning with unlabeled data." Neural Networks 18.5-6 (2005): 719-726. (Year: 2005).*

Rosebrock, "Softmax Classifiers Explained", Sep. 12, 2016, https://pyimagesearch.com/2016/09/12/softmax-classifiers-explained/ (Year: 2016).*

Belanger, David, and Andrew McCallum. "Structured prediction energy networks." International Conference on Machine Learning. PMLR, 2016. (Year: 2016).*

Wikipedia, "Long short term memory", https://en.wikipedia.org/wiki/Long_shortterm_memory, 5 pages, last acessed Feb. 1, 2017.

Rumelhart et al., "Learning Representations by Back-Propagating Errors", Nature vol. 323, dated Oct. 9, 1986, 4 pages.

Robbins et al., "A Stochastic Approximation Method", Institute of Mathematical Statistics, 8 pages.

Hochreiter et al., "Long Short-Term Memory", Neural Computation, Massachusetts Institute of Technology, dated 1997, 46 pages.

"Recursive Description of Patterns", Chapter 11, 51 pages. "Patterns, Automata, and Regular Expressions", Chapter 10, 62 pages.

Vinyals, et al., "Grammar as a Foreign Language", In NIPS, dated 2015, 9 pages.

Hu, et al., "Harnessing Deep Neural Networks with Logical Rules", In Association for Computational Linguistics (ACL), dated 2016, 11 pages.

Blei, et al., "Learning with Scope, with Application to Information Extraction and Classification", In Uncertainty in Artificial Intelligence (UAI), dated 2002, 8 pages.

* cited by examiner

┌─ 102
TRAIN A NEURAL NETWORK, DURING A TRAINING PHASE OF THE NEURAL NETWORK, TO PRODUCE A TRAINED NEURAL NETWORK

┌─ 104
PERFORM INFERENCE, USING THE TRAINED NEURAL NETWORK COMPRISING A FIRST SET OF WEIGHTS, ON A PARTICULAR UNLABELED INPUT TO PRODUCE A FIRST OUTPUT

┌─ 106
DETERMINE WHETHER THE FIRST OUTPUT VIOLATES ONE OR MORE CONSTRAINTS ON OUTPUT VALUES OF THE TRAINED NEURAL NETWORK

┌─ 108
IN RESPONSE TO DETERMINING THAT THE FIRST OUTPUT VIOLATES THE ONE OR MORE CONSTRAINTS ON OUTPUT VALUES OF THE TRAINED NEURAL NETWORK, USE BACKPROPAGATION TO ADJUST THE FIRST SET OF WEIGHTS OF THE TRAINED NEURAL NETWORK TO PRODUCE AN ADJUSTED TRAINED NEURAL NETWORK COMPRISING A SECOND SET OF WEIGHTS, WHERE THE FIRST SET OF WEIGHTS IS DIFFERENT THAN THE SECOND SET OF WEIGHTS

┌─ 110
PERFORM INFERENCE, USING THE ADJUSTED TRAINED NEURAL NETWORK, ON THE PARTICULAR UNLABELED INPUT TO PRODUCE A SECOND OUTPUT; WHEREIN THE SECOND OUTPUT IS DIFFERENT FROM THE FIRST OUTPUT

WHEN OUTPUT UNITS MUST OBEY HARD CONSTRAINTS

BENEFIT CLAIM

This application claims the benefit of Provisional Appln. 62/415,271, filed Oct. 31, 2016, the entire contents of which is hereby incorporated by reference as if fully set forth herein, under 35 U.S.C. § 119(e).

FIELD OF THE INVENTION

The present invention relates to enforcing deterministic constraints on the output of a neural network and, more specifically, to using backpropagation during a testing phase of a trained neural network to adjust the weights of the neural network such that the adjusted neural network is less likely to produce an output that violates deterministic constraints on the trained neural network.

BACKGROUND

Machine learning can encode, within trained models, classification algorithms to classify sequential data (such as: natural language sentences; a series of events resulting from user interaction with a website; network streams; etc.). Classification algorithms classify portions of sequential data with labels, and accurate classification algorithms can be used to glean information from sequential data without intervention of a human. For example, a machine learning algorithm uses a small amount of labeled data to learn an algorithm that classifies English sentences as having positive, negative, or neutral sentiments. As further examples, such a machine learning algorithm can learn whether the behavior, of a consumer represented as a time-series of an online profile, has changed; or to detect attackers in network traffic; or even to automatically find semantic mistakes in computer programs.

Recurrent Neural Networks

A recurrent neural network (RNN, also referred to herein as a "network") is a machine-learning model that is implemented with a network of neural units where connections between units form a directed cycle. The network captures information that has been computed in past iterations of the network, which allows the RNN to exhibit dynamic temporal behavior. Thus, unlike feedforward neural networks, RNNs can use their internal memory to process arbitrary sequences of inputs. For additional information about recurrent neural networks, see *A Critical Review of Recurrent Neural Networks for Sequence Learning* by Zachary C. Lipton, John Berkowitz, and Charles Elkan, published Jun. 5, 2015, the entire contents of which is hereby incorporated by reference as if fully set forth herein.

Training a Recurrent Neural Network

Before a model, such as a recurrent neural network, can be used to classify unlabeled data (i.e., during a testing phase), the model must be trained using labeled data (also known as "training data") during a training phase. Once a model has been trained based on labeled data (or, in other words, has completed the training phase), the model may be applied to classify unlabeled data during a testing phase.

Backpropagation (or "backward propagation of errors") is a technique that is generally used to train a RNN based on a set of training data. During the training phase of an RNN, backpropagation assigns values to parameters within the RNN to assign parameters values within the RNN. This assignment of values to parameters within the RNN causes the RNN to reflect a particular model that is derived from the training data. The values that are assigned to the parameters within the RNN are based on value derivatives that are propagated through the neural network during backpropagation. Additional information about backpropagation is found in "Learning Representations By Back-Propagating Errors", by David E. Rumelhart, Geoffrey E. Hinton, and Ronald J. Williams; Letters to Nature, Vol. 323 (1986), the entire contents of which is hereby incorporated by reference as if fully set forth herein.

Stochastic gradient descent (SGD) can be used in connection with backpropagation to efficiently train a RNN. SGD is a stochastic approximation of the gradient descent optimization method for minimizing an objective (or "loss") function. Additional information about SGD is found in "A Stochastic Approximation Method", by Herbert Robbins, and Sutton Monro; Ann. Math. Statist. Vol. 22, No. 3 (1951), the entire contents of which is hereby incorporated by reference as if fully set forth herein.

Outputs and Constraints of Recurrent Neural Network

A trained neural network is used to perform inference on an input to produce an output based on the model that the trained neural network implements. Inference is an efficient feed-forward step that transforms an input, through one or more intermediate representations via hidden layers of the network, into an output.

Many neural networks have discrete-valued output units that correspond to an inference or prediction about an input. Often, a problem might involve multiple discrete outputs. Unlike multiclass classification, which associates a single discrete output with each input, so-called structured prediction problems associate multiple outputs with each input. For example, in multi-label classification, instead of predicting a single relevant class pertaining to an input (such as an image or natural language sentence), all classes that are relevant to the input must be predicted, e.g., a given image contains a dog, a tree, and a sky.

In sequence prediction problems, the discrete outputs might be a sequence of words or symbols that must form a coherent translation of a source language sentence, description of an image, answer to a question, a parse-tree for an input sentence, etc. Crucially, in structured prediction, the output values are interdependent. Even though neural networks usually predict outputs independently or sequentially (one output at a time), the hidden units allow them to successfully capture many dependencies.

Sometimes, the outputs must obey hard (or deterministic) constraints. For example, in sequence labeling with BILOU encoding, a 'begin' marker B cannot immediately follow an 'inside' marker I. In clustering, pairwise binary decisions must obey transitivity so that they yield a valid equivalence class relation over the data points. In syntactic/dependency parsing, the output sequence must encode a valid parse tree. In formal language generation or neural compilers, the output must belong to a context-free language or compile. In dual decomposition approaches to joint inference, copies of variables must satisfy equality constraints. Finally, in some ensemble methods, the outputs of multiple conditionally independent classifiers must reach a consensus on the output class. Indeed, there are a tremendous number of problems that require hard constraints on the outputs. Unlike softer dependencies, violating a hard-constraint is often unacceptable because the output of the network would not "type-check", causing problems for downstream components.

Unfortunately there is no way of explicitly encoding, into a neural network, deterministic constraints on output variables or of ensuring that a global constraint (i.e., a constraint on the entire output of a network) is satisfied for a given output of the network. Further, in practice, neural networks are not always able to exactly learn deterministic constraints on outputs from training data alone.

As an example, a sequence-to-sequence network inputs a given sentence and outputs a sequence of "shift-reduce" commands that describe the sentence's parse tree. Briefly, the shift-reduce commands control a parsing algorithm by indicating how and when to use a stack. Each command controls whether to shift(s) a token onto the stack, reduce(r) the top of the stack into a parent tree node, or push(!) the current reduction back onto the stack.

To be successful, the network must generate commands that imply a valid tree over the entire input sentence. However, the decoder outputs just a single command at a time, producing some outputs that are not globally-consistent, valid shift-reduce programs. Indeed, a network trained on shift-reduce training data may not be sufficient to learn a rule that would allow the network to satisfy all output constraints for every possible input. As such, the output of the network may not have enough shifts to include every input token in the tree or may attempt to reduce when the stack is empty.

To further illustrate, the following input sentence "So it's a very mixed bag." comprises ten space-delimited tokens (the quotations are part of the input), but a trained and unconstrained sequence-to-sequence network outputs an invalid sequence with only nine shifts ssr!sr!ssssrrr!rr!ssrrrrrr!. Another shi f t must be introduced so the last token is pushed onto the stack and another reduce must be issued so all of the input tokens are inserted into the tree.

One way to enforce constraints on the incorrect output of the network is to perform a discrete search for all possible values, or, in other words, test all combinations of output variables against the constraints, until a combination of output variables is found that satisfies the constraints. Such a discrete search is necessarily exhaustive, and it is expensive to search over such a large solution space.

Alternatively, an attempt could be made to fix the output with post-processing of the network outcome. According to post-processing, if a particular output of a network does not satisfy applicable constraints, one or more rules or heuristics that are specific to the violating output are formulated to correct the constraint violation in the particular outcome. However, it is a difficult task to determine where the right place is to insert or remove commands, in the sequence of commands, as required to satisfy the output constraints. Continuing with the previous example, there are 406=choose(29, 2) candidate locations for insertion of the additional required shift and reduce commands within the output string ssr!sr!ssssrrr!rr!ssrrrrrr!. Further complicating the post-processing dilemma is the fact that an output may contain errors that are seemingly unrelated to the output constraint, as with the example above.

Instead of using post-processing or discrete search, an attempt could be made to fix a constraint violation problem with a more sophisticated decoder, but it is difficult to formulate a more sophisticated decoder because decoders output a single character at each time-step, limiting corrections to enforce the global output constraints to the end of sequence production when it is too late to rectify an earlier decision.

A beam search, which is a heuristic search algorithm that explores the most promising options in a limited set of options, is less myopic than a discrete search. However, in practice most of the network's output mass is peaked on the best output token, and application of a beam search results in little improvement.

It would be beneficial to utilize an inference method for neural networks that effectively enforces hard output constraints without requiring performance of post-processing, decoders, a beam search, or expensive discrete search over the feasible space.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Neural networks are applied to complex problems in natural language processing (NLP), such as syntactic parsing, that have rich output structures. Many such applications require deterministic constraints on the output values; for example, requiring that the sequential outputs encode a valid tree. While hidden units might capture such properties, the network is not always able to learn them from the training data alone.

Embodiments provide a system for enforcing hard constraints in neural networks that is a more efficient use of computing resources than prior approaches, such as discrete search or post processing, since embodiments are inherently less resource-intensive than prior approaches and particular embodiments are bound to a certain number of processing iterations to further limit resource requirements. Embodiments enforce hard constraints within neural networks that produce multiple outputs, including those without recurrence, such as various feed-forward convolutional neural network architectures and cellular neural networks.

According to embodiments, for each input, one or more continuous weights of a neural network are iteratively nudged during a testing phase of the network until the network's unconstrained inference procedure generates an output that satisfies the constraints. This is achieved by expressing the hard constraints as an optimization problem over the continuous weights and employing backpropagation to iteratively change the weights.

The use of backpropagation during test-time is not performed prior to embodiments because the constraint loss is necessarily a function of the argmax that produced the discrete values. However, embodiments circumvent this problem by optimizing over the energy of the violating outputs instead. Since the weights directly determine the output through the energy, embodiments are able to manipulate the unconstrained inference procedure to produce outputs that conform to global constraints. Much like scoped-learning, embodiments customize the weights for each example at test-time, but do so in a way to satisfy the constraints.

Referring to the previously-presented example input sentence "So it's a very mixed bag.", an original unconstrained sequence-to-sequence network produced an invalid sequence of "shift-reduce" commands that incorrectly described the sentence's parse tree (s sr!sr!ssssrrr!rr!ssrrrrrr!). When embodiments are applied to the neural network that produced the incorrect output, to modify the weights of the network at test-time, enough energy mass is removed from the invalid output space (according to a particular embodiment, in only twelve steps), allowing unconstrained decoding to produce a valid output sequence:

ssr!sr!ssssrrr!rr!ssrrrrrr! (initial output)
sssr!ssssrr!srrr!rr!ssrrrrrr! (rectified output)

Interestingly, the network generates an additional s command at the beginning of the sequence while also producing a cascade of error correction in later time steps: the new output now satisfies the constraints and is a perfectly correct parse. Of course, enforcing constraints does not always lead to an improvement in output accuracy. However, when a network enforces hard constraints, the network's output has a chance of being correct and, for a well-trained network, it is likely that a more accurate result will be produced after enforcing hard constraints than would be produced without hard constraint enforcement.

Neural Networks

A neural network that generates a variable length output vector $y=\{y_i\}_1^{n_y}$ from a variable length input vector $x=\{x_i\}_1^{m_x}$ has many possible applications. For example, in image classification, the input vector encodes a fixed multi-dimensional tensor of pixel intensities and the output vector comprises just a single element corresponding to the discrete class label. In sequence-to-sequence, the input might be a variable length vector of French tokens, and the output would be a variable length vector of the English translation of the French tokens. It is sometimes convenient to think of the network as a function from input to output as described in Equation 1:

$$f(x; W) \mapsto y \qquad (1)$$

However, for the purpose of exposition, the neural network is separated herein into a real-valued model (negative energy function) that scores the compatibility of the outputs (given the weights and input) and an inference procedure that searches for high scoring outputs.

For the model, let $y_i$ be a discrete output from an output unit and let $\psi(y_i; x, W)$ be its corresponding real-valued log-space activation score (e.g., the log of the softmax for locally normalized models or simply a linear activation value for globally normalized models). The negative energy $\Psi$ is defined over a collection of output values y as an exponentiated sum of log-space activation scores as shown in Equation 2:

$$\Psi(y;x,W) = \exp(\Sigma_i \psi(y_i;x,W)) \qquad (2)$$

Then, inference is the problem of finding the values of the outputs y that maximize the negative energy given fixed inputs x and weights W. Thus, the neural network can be rewritten as the function shown in Equation 3:

$$f(x; W) \mapsto \underset{y}{\mathrm{argmax}}\,\Psi(y; x, W) \qquad (3)$$

The purpose of separating the model from the inference procedure is so that it is possible to later formalize an optimization problem for the neural network. This formulation is consistent with existing neural networks. Indeed, inference in feed-forward networks is a single feed-forward pass from inputs to outputs. When the outputs only depend on each other through hidden states that only depend on earlier layers of the network, feed-forward inference is exact in the sense that the feed-forward inference finds the optimum of Equation 3 For recurrent neural networks (RNNs), each output depends on hidden states that are functions of previous output values. However, it is still possible to think of the usual procedure that produces the highest scoring output at each time step as a local greedy approximation to global inference; of course, the procedure can be improved with a beam that keeps track of multiple outputs in order to find an output with a better score.

Constrained Inference for Neural Networks

A major advantage of neural networks is that, once trained, unconstrained neural network inference is extremely efficient. Embodiments take advantage of the fact that unconstrained inference is inexpensive by exploiting unconstrained inference as a black box within a constrained inference algorithm. Embodiments iteratively adjust the weights for each test-time input, concentrating the probability mass on the feasible region (or the region of potential outputs that satisfy the constraints) so that unconstrained inference becomes increasingly likely to generate an output that satisfies the constraints.

Focus is placed herein on constraints that require outputs to belong to an input-dependent context-free language $L^x$. A context-free language (CFL) is a language generated by a context-free grammar, which describes all possible strings in the CFL. Additional information about regular expressions and context-free grammars is found in "Foundations of Computer Science", by Alfred V. Aho and Jeffrey D. Ullman; Chapters 10 and 11 (1992), the entire contents of each of which is hereby incorporated by reference as if fully set forth herein.

The idea is to treat the output space of the neural network as the terminal symbols, and devise the appropriate production rules and non-terminals to express constraints on them. An advantage of employing CFLs over other formalisms such as first order logic (FOL) is that CFLs are intuitive for expressing constraints on the outputs, especially for language models and sequence-to-sequence networks. For example, when modeling Python or Java code, it is easy to express many of the constraints of the desired programming language using a CFL, but cumbersome in FOL. Indeed, CFLs are an expressive class of languages.

The following Equation 4 represents a constrained inference problem for neural networks:

$$\max_{y} \Psi(x, y, W) \quad (4)$$
$$\text{s.t.} \quad y \in L^x$$

Naively enforcing the constraint requires combinatorial discrete search, which is intractable in general. A smooth optimization problem with meaningful gradients is preferable to guide the search.

With this in mind, let $g(y, L) \mapsto r$ for $r \in \mathbb{R}_+$ be a function that measures a loss between a sentence y and a grammar L such that $g(y, L)=0$ if and only if there are no grammatical errors in y. That is, $g(y, L)=0$ for the feasible region and is strictly positive everywhere else. For a large class of CFLs, g could be the least errors count function or a weighted version thereof (For additional information about the least errors count function, see Gordon Lyon, "Syntax-directed least-errors analysis for context-free languages: A practical approach". Programming Languages, 17(1), January 1974, the entire contents of which are hereby incorporated by reference as if fully set forth herein.) CFL membership could then be expressed as an equality constraint allowing for minimization of the Lagrangian, as shown in Equation 5:

$$\min_{\lambda} \max_{y} \Psi(x, y, W) + \lambda g(y, L) \quad (5)$$

However, this dual optimization problem has a major issue. The required constraints are global and do not necessarily factorize over the individual outputs. Consequently, there is just a single dual variable λ. Optimizing λ does little more than eliminate a single contour of output configurations at a time, resulting in a brute-force trial and error search.

Instead, observe that the network's weights control the negative energy of the output configurations. By properly adjusting the weights, the outcome of inference can be affected by removing mass from invalid outputs. The weights are likely to generalize much better than the single dual variable because, in most neural networks, the weights are tied across space (e.g., cellular neural networks) or time (e.g., recurrent neural networks). As a result, lowering the negative energy for a single invalid output has the effect of lowering the negative energy for an entire family of invalid outputs, enabling faster search.

As such, an independent copy $W_\lambda$ of the network's weights W is introduced and the modified Lagrangian is minimized with respect to these "dual weights" (shown in Equation 6) instead of the dual variable as depicted in Equation 5. This is powerful because the adjustment has effectively introduced an exponential number of "dual variables" (via the energy, which scores each output) that can be easily control via the weights; although similar, the new optimization expressed in Equation 6 is no longer equivalent to the original:

$$\min_{W_\lambda} \max_{y} \Psi(x, y, W) + \Psi(x, y, W_\lambda) g(y, L) \quad (6)$$

While a step in the right direction, the objective still requires combinatorial search because (1) the maximization involves two non-linear neural networks and (2) a greedy decoding algorithm is unable to cope with the global loss function go because the constraints do not factorize over the individual outputs. In contrast the functions involved in classic Lagrangian relaxation methods for NLP have multipliers for each output variable that can be combined with linear models to form a single unified decoding problem for which efficient inference exists. Since the non-linear functions and global constraints do not afford the same ability, the optimization problem is modified for a final time so that the network's efficient inference procedure can be employed as a black-box. In particular, (1) the negative-energy term that involves the original weights W is removed and such removal is balanced, according to embodiments, with a regularizer that attempts to keep the dual weights $W_\lambda$ as close to the original weights as possible and (2) embodiments maximize exclusively over the network parameterized by $W_\lambda$. The resulting Equation 7 is a different optimization problem on which embodiments are based:

$$\min_{W_\lambda} \left( \Psi(x, y, W_\lambda) g(y, L^x) + \alpha \|W - W_\lambda\|_2 \mid y = \arg\max_{y} \Psi(x, y, W_\lambda) \right) \quad (7)$$

Informally, embodiments alternate the maximization (by running efficient unconstrained inference) and minimization (by performing SGD) (referred to herein as "iterations") until a feasible output is produced or a maximum number of iterations are exceeded. For each test-example, the dual weights are re-initialized to the trained weights to ensure the network does not deviate too far from the trained network. More precisely, see Algorithm 1:

---
Algorithm 1 Constrained inference for neural nets

Inputs: test instance x, input-specific CFL $L^x$, pretrained weights W
$W_\lambda \leftarrow W$ #reset instance-specific weights
while not converged do $y \leftarrow f(x; W_\lambda)$ #perform inference using weights $W_\lambda$ $\nabla \leftarrow \frac{\partial}{\partial W_\lambda} \Psi(x, y, W_\lambda) g(y, L^x) + \alpha \|W - W_\lambda\|_2$ #compute constraint loss $W_\lambda \leftarrow W_\lambda - \eta \nabla$ #update instance-specific weights with SGD or a variant thereof end while

---

Application to Parsing

Embodiments are described in the context of the structured prediction problem of syntactic parsing in which the goal is to input a sentence comprising a sequence of tokens and output a tree describing the grammatical parse of the sentence. One way to model the problem with neural networks is to linearize the representation of the parse tree and then employ the familiar sequence-to-sequence model.

For example, a tree could be linearized using a sequence of shift(s) and reduce (r, r!) commands that control an implicit shift reduce parser. Intuitively, these commands describe the exact instructions for converting the input sentence into a complete parse tree: the interpretation of the symbol s is an instruction to shift an input token onto the stack and the interpretation of the symbol r is an instruction to start (or continue) reducing (popping) the top elements of the stack, the interpretation of a third symbol ! is an instruction to stop reducing and push the reduced result back onto the stack. Thus, given an input sentence and an output sequence of shift-reduce commands, the tree can be deterministically recovered by simulating a shift-reduce parser. For example, the sequence ssrr!ssr!rr!rr! encodes a type-free version of the parse tree (S (NP the ball) (VP is (NP red))) for the input sentence "the ball is red". It is possible to recover the tree structure from the input sentence and the output commands by simulating a shift reduce parser and performing one command at a time as prescribed by the classic algorithm.

For output sequences to form a valid tree over the input, the sequence must satisfy a number of hard constraints. First, the number of shifts must equal the number of input tokens $m_x$, otherwise either the tree would not cover the entire input sentence or the tree would contain spurious terminal symbols. Second, the parser cannot issue a reduce command if there are no items left on the stack. Third, the number of reduces must be sufficient to leave just a single item, the root node, on the stack.

Most of these constraints can be expressed with a CFL, as depicted in Equation 8:

$$L = \begin{cases} G \to sRr! \\ R \to sRr \\ R \to Rr! \\ R \to RR \\ R \to \varepsilon \end{cases} \quad (8)$$

Intuitively, Rule 1 of Equation 8 states that a valid shift-reduce command set must (a) begin with a shift (since the stack is initially empty, there is nothing to reduce) and (b) end with a reduce that places the final result on the stack. Rule 2 states that if a shift is performed, then reducing the shifted token is needed at some point in the future. Rule 3 states that if a shift is not performed then a reduce is allowed only if the result is also pushed on the stack. Rule 4 allows for multiple subtrees. Rule 5 is the base case.

However, this grammar is for a general purpose shift-reduce language, and there is a need to constrain the number of shifts to equal the number of input tokens $m_x$. Since this constraint is a bit verbose to express with production rules, the regular language $(s(r!)*m_x(r!)*$ can be written, where m is the number of elements in x and the regular language expression can be intersected with the CFL of Equation 8, as shown in Equation 9:

$$L^x = L \cap (s(r!)*m_x(r!)* \quad (9)$$

Rather than relying on a general purpose algorithm to compute $g(y, L^x)$ that measures the number of grammatical errors, instead a language-specific implementation of the loss function may be employed, according to embodiments. Let $ct_{i=1}^n(b(i))$ be the function that counts the number of times proposition $b(i)$ is true. Now, the following loss function is defined in Equation 10:

$$g(y, L^x) = \left(m - ct_i(y_i = s)\right)^2 + \quad (10)$$

$$\left(\sum_i ct_{j>i}(y_j = r) - ct_{j>i}(y_j \in \{s, !\})\right)^2 + ct_i(y_i = r) - \left(ct_i(y_i \in \{s, !\})\right)^2$$

The first term of Equation 10 measures the amount of violation in an output due to the regular language and the second and third terms of Equation 10 measure the amount of violation in the output according to the CFL. Embodiments use such a loss equation to determine whether constraints have been violated by outputs of a network.

According to embodiments, a loss equation that encodes the hard constraints for a given trained RNN, such as Equation 10, is provided by a source entity (such as a user) to a system that implements embodiments. According to further embodiments, CFL and/or regular language that defines the hard constraints is provided to the system. In response to receiving the CFL and/or regular language, the system automatically formulates a loss function, based on the CFL and/or regular language, that encodes the hard constraints that are expressed in the received CFL and/or regular language. Such an automatically-generated may be derived based on the least errors count function described above.

Related Work

There has been recent work in applying neural networks to structured prediction problems. For example, the recent structured prediction energy networks (SPENS) combines graphical models and neural networks via an energy function defined over the output variables. SPENS focuses on soft constraints (via the energy function) and performs inference by relaxing the binary output variables to be continuous and then backpropagating into them. In contrast, embodiments focus on hard constraints and embodiments backpropagate into the weights rather than into the outputs directly.

There has been recent work on applying neural networks to parsing problems that require the ability to handle hard constraints. For example, by employing a sequence-to-sequence network or a custom network designed for shift reduce parsing. The former requires the output to form a valid parse tree and hence post-processing is employed to ensure this property. The latter satisfies constraints as part of the decoding process by sampling over a combinatorial space. Embodiments do not rely on post processing or discrete search.

Another intriguing approach is to distill the hard constraints into the weights at training time using a teacher network, which does not require constrained inference or combinatorial search. However, unlike embodiments, the method must achieve a difficult balance between the loss due to the training data and the loss due to the constraint violations. Further, unlike embodiments, it would crucially rely on network's ability to generalize the constraints learned on the training data to the testing data.

Finally, according to dual decomposition and, more generally, to Lagrangian relaxation for structured prediction, it is assumed that a computationally efficient inference algorithm can maximize over a superset of the feasible region (indeed this assumption parallels exploitation, in embodiments, of the fact that unconstrained inference in the neural network is efficient). Then, dual decomposition employs gradient descent to gradually concentrate this superset onto the feasible region until the constraints are satisfied. However, for computational reasons, these techniques assume that the constraints factorize over the output and that the functions are linear so that they can be combined into a single model. In contrast, embodiments described herein have a single dual variable and, as such, embodiments minimize with respect to the weights, which generalize better over the output.

Experiments

Herein is described application of embodiments, i.e., of the constrained inference procedure, on two sequence-tosequence tasks. The first is a transduction task being performed by a recurrent neural network (RNN) 224 (depicted in FIG. 2, which represents an example arrangement of resources for implementing embodiments) between two simple languages, which is described next. The second is the sequence-to-sequence shift-reduce parsing task being performed by a different application of RNN 224, which shift-reduce parsing task is described above.

Figure 2:
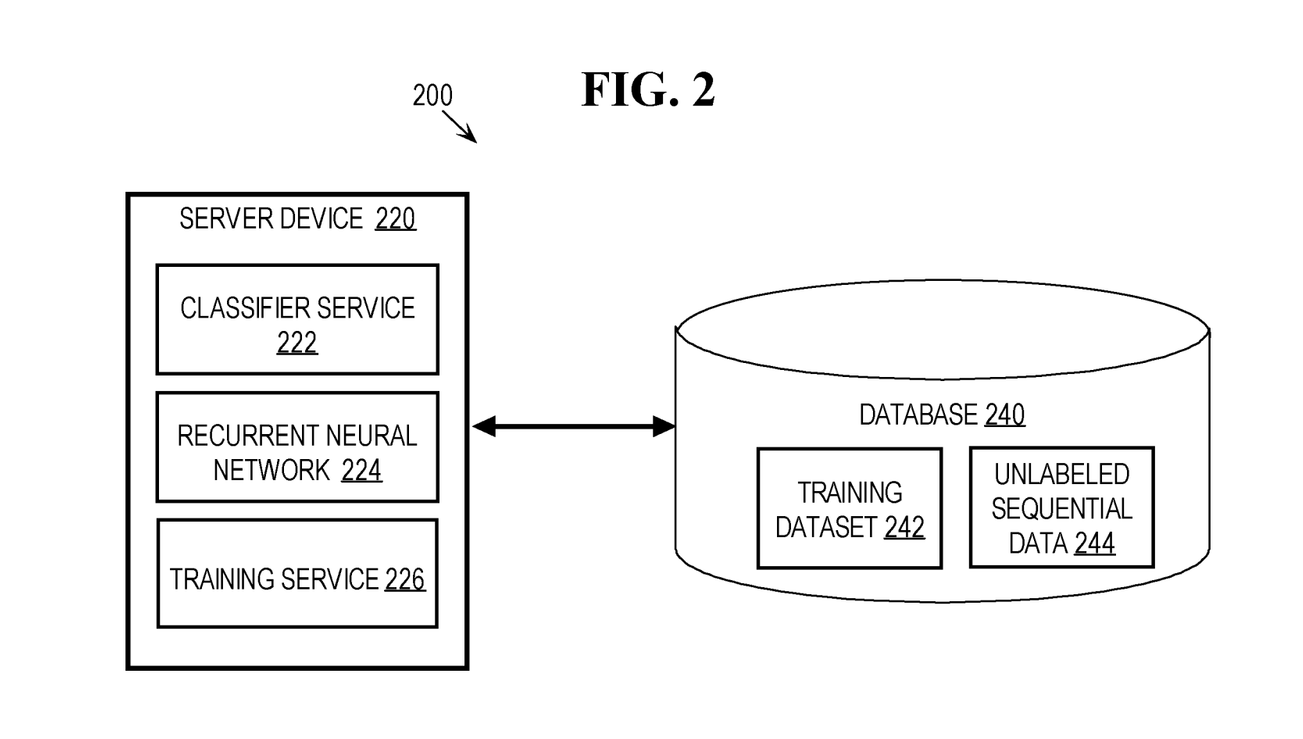
FIG. 2 is a block diagram that depicts an example system arrangement for enforcing hard constraints on the output of a neural network.

A transducer T: $L_1 \rightarrow L_2$ is a function from a source language to a target language. For the purpose of the experiments, T is known and the goal is to learn T from a training dataset 242. The source language $L_0$ is (az|bz)* and the target language $L_1$ is (aaa|zb)*. The transducer is defined to map az to aaa and bz to zb. For example, $\Psi$(bzazbz) ↦ zbaaazb. Training dataset 242 comprises 1934 sequences of length 2-20 and unlabeled sequential data 244, i.e., the test set, contains sentences of lengths 21-24. As such, in this example shorter sentences are employed for training to require generalization to longer sentences at test time.

According to an example embodiment, RNN 224 is a thirty-two hidden unit single-layered, attentionless, sequence-to-sequence long short-term memory (LSTM). In RNN 224, the decoder LSTM inputs the final encoder state at each time-step. (Additional information about LSTM is in "Long short-term memory", by Sepp Hochreiter and Jürgen Schmidhuber; Neural Computation, Vol. 9 Issue 8 (1997), the contents of which are incorporated by reference as if fully set forth herein.) Notwithstanding the example configuration, any number of hidden units and layers may be used in a network according to embodiments.

The encoder and decoder LSTMs each have their own set of weights. According to the example embodiment, the network is trained for 1000 epochs using RMSProp (Root Mean Square Propagation) to maximize the likelihood of the output (decoder) sequences in the training set. The network achieves perfect train accuracy while learning the rules of the output grammar nearly perfectly, even on the test-set. However, despite learning the train-set perfectly, the network fails to learn the input-specific constraint that the number of a's in the output should be three times the number of a's in the input.

A loss function, shown in Equation 11 below, is implemented for this constraint of the a zbz task::

$$g(y, L_1^x) = (n+m)^{-1}((3\Sigma_{x_i} I(x_i=a)) - (\Sigma_{y_i} I(y_i=a)))^2 \quad (11)$$

where n+m, the combined input/output length, normalizes between 0 and 1. According to the described example, data depicted in Tables 1-4 shows how well the constraint is enforced at test-time. In this example, constrained inference Algorithm 1 is run and vanilla stochastic gradient descent is employed with a learning rate of 0.05 and no weight decay. The number of iterations is capped at a maximum of 100.

The top section of Table 1 (below) contains the results for this azbz task. The term "converted" is used, purposes of discussion of Table 1, to refer to a sentence that initially had a constraint-violation, but was later fixed by the constrained-inference procedure. The conversion rate is the percentage of such sentences that are "converted". For example, on the task set out in Table 1, the conversion rate goes up to two-thirds.

According to embodiments, one or more of the weights, among all of the weights, may be selected for adjustment. In the example embodiment, all weights are iteratively adjusted rather than adjusting only a strict subset of the weights. Furthermore, omitting the negative energy of the original weights W from the optimization problem, could potentially allow the network to find a set of dual weights $W_\lambda$ that happen to satisfy the constraints, but that have poor performance. However, this not the case in practice. In fact, the token-wise accuracy of embodiments improves over the examples for which the unconstrained neural network violated constraints. Further, the regularizer is unnecessary since the initialization $W_\lambda = W$ ensures the network never drifts too far from the original set of weights.

TABLE 1

Conversion rates on all three tasks with 100 steps of SGD. Satisfying the constraints has no negative affect on accuracy and often has a positive effect.

| task | inference | weights changed (Wλ) | conversion rate | accuracy |
|---|---|---|---|---|
| azbz | unconstrained | none | 0.0% | 75.6% |
| | constrained | all | 65.2% | 82.4% |
| | constrained | output only | 20.9% | 77.8% |
| | constrained | encoder only | 58.2% | 82.5% |
| | constrained | decoder only | 57.4% | 82.3% |
| sr no types | unconstrained | none | 0.0% | 84.0% |
| | constrained | all | 81.8% | 84.4% |
| sr with types | unconstrained | none | 0.0% | 87.8% |
| | constrained | all | 79.2% | 88.3% |
| | constrained | output only decoder | 5.0% | 88.1% |
| | constrained | (top layer) decoder | 36.2% | 88.2% |
| | constrained | (all layers) | 54.7% | 88.3% |
| | constrained | decoder (top) + attention | 38.0% | 88.1% |
| | constrained | decoder (all) + attention | 56.5% | 88.2% |

In order to gain a better understanding of the algorithm's behavior, data-cases that highlight both success and failure are presented below in Tables 2, 3, and 4. The title of these tables is the input and the desired ground truth output. The rows of the table show the network's output at each indicated iteration. The loss column is the constraint loss weighted by the output's energy $\Psi(x, y, W_\lambda)g(y, L_1^x)$, and the final column is the token-wise accuracy between the output and the ground truth.

TABLE 2

An example for which enforcing the constraints improves accuracy. Bold indicates errors. The output changes more than once before the constraints are finally enforced. Greedy decoding with constraints might correct this example because the spurious a's are at the end of the sequence.

bzazbzazbzazbzbzbzbzbz → zbaaazbaaazbaaaaazbzbzbzbzb

| iteration | output | loss | accuracy |
|---|---|---|---|
| 0 | zbaaazbaaazbaaaaazbzbzbaaazbzb | 0.260 | 75.0 |
| 39 | zbaaazbaaazbaaaaazbzbzbaaazbzb | 0.259 | 75.0 |
| 40 | zbaaazbaaazbaaaaazbzbzbaaazb | 0.250 | 80.0 |
| 72 | zbaaazbaaazbaaaaazbzbzbaaazb | 0.249 | 80.0 |
| 73 | zbaaazbaaazbaaaaazbzbzbzb | 0.0 | 100.0 |

TABLE 3

An example for which enforcing the constraints improves accuracy. Bold indicates errors. Greedy decoding with constraints would not fix the errors in the middle since errors are made before constraints are violated. In contrast, embodiments take the constraints into account in a global manner, allowing earlier errors to be corrected by future constraint violations.

azazbzazbzbzbzazbzbzbzbzbz → aaaaaazbaaazbzbaaazbzbzbzbzb

| iteration | output | loss | accuracy |
|---|---|---|---|
| 0 | aaaaaazbaaazbaaazbzbzbzbaaazb | 0.2472 | 66.7 |
| 1 | aaaaaazbaaazbaaazbzbzbzbaaazb | 0.2467 | 66.7 |

TABLE 3-continued

An example for which enforcing the constraints improves accuracy. Bold indicates errors. Greedy decoding with constraints would not fix the errors in the middle since errors are made before constraints are violated. In contrast, embodiments take the constraints into account in a global manner, allowing earlier errors to be corrected by future constraint violations.
azazbzazbzbzazbzbzbzbzbz → aaaaaazbaaazbzbaaazbzbzbzbzb

| iteration | output | loss | accuracy |
|---|---|---|---|
| 2 | aaaaaazbaaazbaaazbzbzbzbaaazb | 0.2462 | 66.7 |
| 3 | aaaaaazbaaazbzbaaazbzbzbzbzb | 0.0 | 100.0 |

TABLE 4

An example for which enforcing the constraints degrades accuracy. Errors bolded.
bzbzbzbzazbzbzazazazazbz → zbzbzbzbaaazbzbaaaaaaaaaaaazb

| iteration | output | loss | accuracy |
|---|---|---|---|
| 0 | zbzbzbzbaaazbaaaaaaaaaaaaazbaaa | 0.2954 | 74.2 |
| 4 | zbzbzbzbzbaaaaaaaaaazbzbaaaaaa | 0.0 | 60.0 |

Table 2 contains an example for which embodiments successfully satisfy the constraints resulting in perfect accuracy. However, because the constraint violation appears at the end of the string, a greedy decoder that opportunistically enforces constraints on the fly could potentially correct this error.

Table 3 shows a more interesting example for which such a greedy decoder would not be as successful. In particular, the unconstrained network outputs the final aaa too early in the sequence, but the constraint that controls the number of a's in the output is not violated until the end of the sequence. Because embodiments take the constraint into account globally, embodiments allow the network to not only rectify the constraint, but to achieve perfect accuracy on the sentence (in just four gradient updates).

Finally, Table 4 shows an example for which enforcing the constraints hurts the accuracy. The updates cause the network to erroneously change outputs that were actually correct. This can happen if (a) the underlying network is inaccurate in its output or confidence/probabilities thereon or (b) the gradient steps are too large causing the network to completely leapfrog over the correct solution in a single step. Embodiments avoid the latter error by normalizing the constraint loss so that the loss does not grow unbounded with the number of outputs and by erring on the side of a smaller learning rate.

Example Implementation of Constraint Enforcement in a Neural Network

Figure 1:
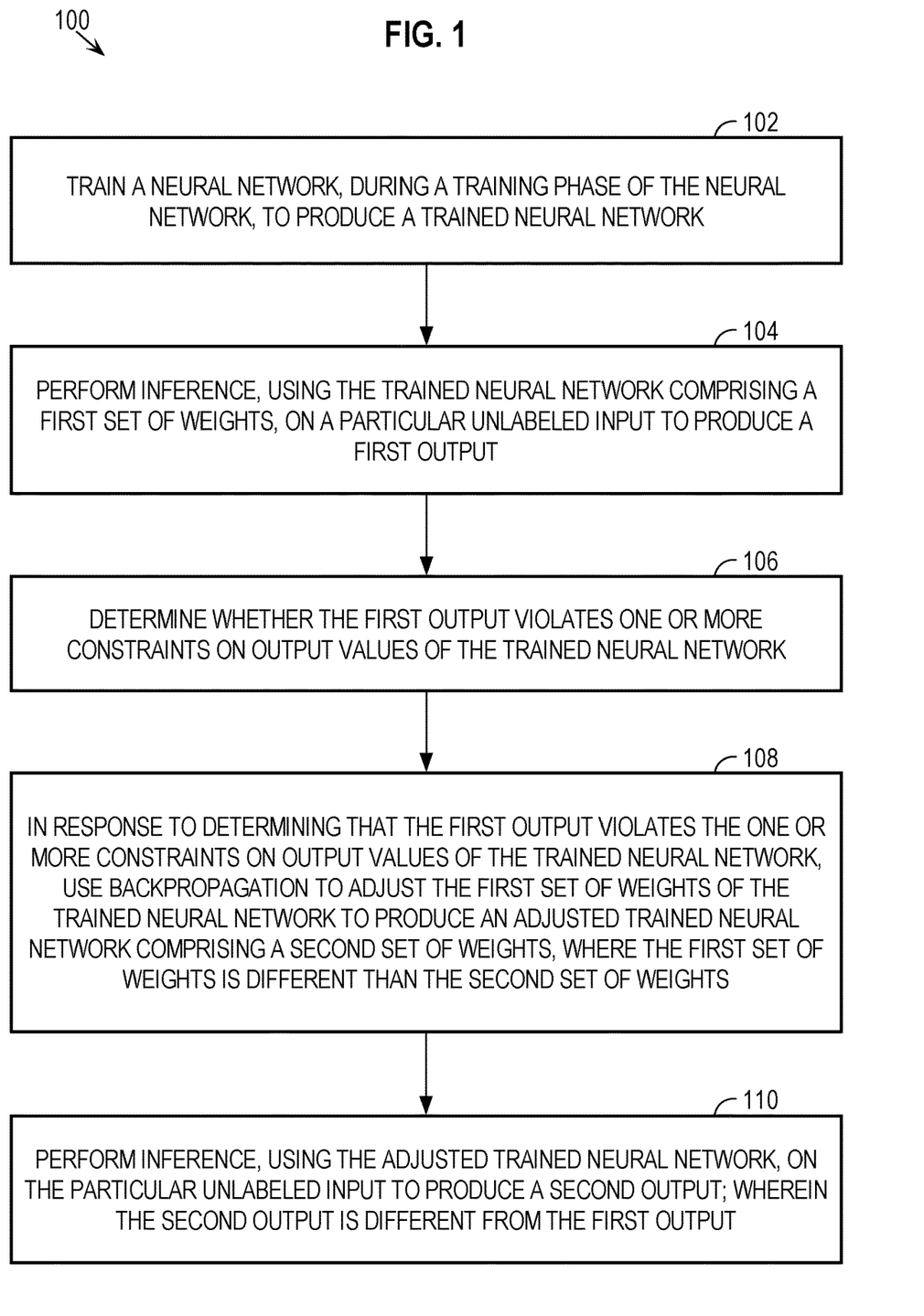
FIG. 1 depicts a flowchart for enforcing hard constraints on the output of a neural network.

FIG. 1 depicts a flowchart 100 for applying Algorithm 1 to enforce constraints in a neural network, such as recurrent neural network (RNN) 224 depicted in system arrangement 200 of FIG. 2. At step 102, a neural network is trained, during a training phase of the neural network, to produce a trained neural network. For example, during a training phase of RNN 224, a training service 226 assigns values to parameters of RNN 224 based on a training dataset 242 that includes at least a set of inputs for a shift-reduce parsing task (i.e., described above in connection with the input "So it's a very mixed bag."). Training dataset 242 also includes outcomes for the shift-reduce parsing task, where each outcome corresponds to a corresponding input of the set of inputs for the shift-reduce parsing task in training dataset 242.

Using training dataset 242 during the training phase of RNN 224, training service 226 trains RNN 224 to produce the outcomes indicated in training dataset 242 given the corresponding inputs. Once RNN 224 is trained based on the set of shift-reduce parsing task inputs and outcomes in training dataset 242, inference can be performed using trained RNN 224 to produce an outcome for the shift-reduce parsing task for an input that was not included in training dataset 242. According to this example, unlabeled sequential data 244 includes inputs for the shift-reduce parsing task that are not paired with correct outcomes. In other words, unlabeled sequential data 244 is data (such as data mined from the Internet) that is available for shift-reduce parsing, such as in connection with solving a real-world problem. Unlabeled data is unlabeled because it has not had the correct outcome associated therewith by a human, unlike the data in training dataset 242.

According to embodiments, steps 104-110 of flowchart 100 are performed after completing the training phase of the neural network. At step 104, inference is performed, using the trained neural network comprising a first set of weights, on a particular unlabeled input to produce a first output. For example, classifier service 222 performs inference on a particular input in unlabeled sequential data 244 using trained RNN 224. Trained RNN 224 comprises a first set of weights, which are (for example) the original weights that resulted from training RNN 224 over training dataset 242.

To illustrate, classifier service 222 uses trained RNN 224 to perform inference on the input "So it's a very mixed bag.", which comprises tokens delimited by spaces as described above. Since RNN 224 is trained to infer an outcome of the shift-reduce parsing task described above, performing inference on unlabeled data using trained RNN 224 will produce a shift-reduce parsing outcome for the input.

As depicted in Table 5 below, the first iteration of applying RNN 224 to perform the shift-reduce parsing task for "So it's a very mixed bag." results in the outcome "ssr!sr!ssssrrr!rr!ssrrrrrr!".

TABLE 5

A shift-reduce example for which the method successfully enforces constraints. The initial output has only nine shifts, but there are ten tokens in the input. Enforcing the constraint not only corrects the number of shifts to ten, but changes the implied tree structure to the correct tree.
("So it's a very mixed bag.") → sssr!ssssrr!srrr!rr!ssrrrrrr!

| iteration | output | loss | accuracy |
|---|---|---|---|
| 0 | ssr!sr!ssssrrr!rr!ssrrrrrr! | 0.0857 | 33.3% |
| 11 | ssr!sr!ssssrrr!rr!ssrrrrrr! | 0.0855 | 33.3% |
| 12 | sssr!ssssrr!srrr!rr!ssrrrrrr! | 0.0000 | 100.0% |

At step 106 of flowchart 100, it is determined whether the first output violates one or more constraints on output values of the trained neural network. For example, classifier service 222 determines whether the output "ssr!sr!ssssrrr!rr!ssrrrrrr!" violates constraints on the shift-reduce parsing task for which RNN 224 is trained. For example, training service 226 uses the loss function of Equation 10 to determine whether the output violates the constraints encoded in the loss function. In this case, training service 226 determines that the outcome does not conform to the constraints for the shift-reduce parsing task.

At step 108, in response to determining that the first output violates the one or more constraints on output values of the trained neural network, backpropagation is used to adjust the first set of weights of the trained neural network to produce an adjusted trained neural network comprising a second set of weights, where the first set of weights is different than the second set of weights. For example, because the output of the previous application of RNN 224, "ssr!sr!ssssrrr!rr!ssrrrrrr!", violates the one or more constraints on outputs of RNN 224, training service 226 automatically adjusts the weights in RNN 224 to discourage RNN 224 from outputting that result again.

Specifically, through backpropagation, training service 226 computes the gradient (using SGD) of Equation 2 with respect to W (the set of weights used in RNN 224 to produce the first output). This is explained in further detail in connection with Algorithm 1, specifically, in connection with the second line of the while loop that computes nabla. Equation 2 defines the negative energy of a given output (such as the output "s sr!sr!ssssrrr!rr!s srrrrrr!") within RNN 224 given W and the input string. As depicted in the third line of the while loop in Algorithm 1, training service 226 automatically applies the resulting gradient (represented by nabla in Algorithm 1), multiplied by the loss function g( ), to the previous set of weights W to produce an updated set of weights. Training service 226 adjusts RNN 224 (to produce an adjusted RNN 224) to use the updated set of weights, where the adjusted RNN 224 is less likely to output the first output given the input string. In this way, embodiments utilize Algorithm 1 to globally enforce constraints on the shift-reduce parsing task as executed by RNN 224.

At step 110 of flowchart 100, inference is performed, using the adjusted trained neural network, on the particular unlabeled input to produce a second output. For example, classifier service 222 again performs inference on the input "So it's a very mixed bag.", using the newly adjusted RNN 224 (from step 108). As depicted in Table 5, at the $11^{th}$ iteration of performing inference using RNN 224 (where each iteration after the first iteration is performed after further adjusting the weights of RNN 224 as described in connection with step 108), the adjusted RNN 224 outputs "ssr!sr!ssssrrr!rr!ssrrrrrr!", which is the same output as the $0^{th}$ iteration. However, at the $12^{th}$ iteration, the adjusted RNN 224 (as adjusted after the $11^{th}$ iteration) outputs "sssr!ssssrr!srrr!rr!ssrrrrrr!". As such, by the $12^{th}$ iteration, the output of RNN 224 is different from the output that was originally produced by RNN 224.

At the $12^{th}$ iteration of adjusting RNN 224 and performing inference using the adjusted weights, the output of RNN 224 conforms to the constraints on outputs for RNN 224. Since the constraints on the output are not violated in the output of the $12^{th}$ iteration, the output has a chance of being correct (as an output that violates hard constraints is, by definition, incorrect). In the case of the output at the $12^{th}$ iteration, the output both is correct and does not violate any constraints.

In this example embodiment, the number of hidden units in the network are set to sixty-four to accommodate a large input space (50 k words). Also in this example embodiment, Equation 10 (normalized by sequence length) is employed for the constraint loss. Otherwise, this example embodiment employs the same parameters as the azbz task described above, both for training the neural network and for implementation of the embodiment.

Finally, according to an example, embodiments are applied to a version of the shift-reduce experiment that includes the phrase types (e.g., noun-phrase (NP)). To accommodate the larger output space (output alphabet size increases to 479), a larger network with 128 hidden units, attention and three-layers is employed. Even this more sophisticated network fails to learn the constraints from data and adding layers does not help. The larger network affords the opportunity to experiment with modifying different subsets of weights for enforcing constraints. As seen in the last section of Table 1, modifying all the weights works best, converting 79.2% of the violating sentences; again without negatively affecting accuracy.

Architecture for a Recurrent Neural Network Equipped with A Differentiable Set Data Structure FIG. 2 is a block diagram that depicts an example system arrangement 200 for enforcing hard constraints on the output of a neural network, according to embodiments. System arrangement 200 includes a server device 220 and a database 240 communicatively coupled using any communication hardware or protocol that allows communication between the device and the database. Example system arrangement 200 may include other devices, including client devices, server devices, cluster nodes, and display devices, according to embodiments.

Server device 220 may be implemented by any type of computing device that is capable of communicating with database 240. In system arrangement 200, server device 220 is configured with classifier service 222, RNN 224, and training service 226. Any of the functionality attributed to classifier service 222, RNN 224, and/or training service 226 herein may be performed by another entity of system arrangement 200, according to embodiments. Server device 220 may be configured with other mechanisms, hardware, processes, and functionalities, depending upon a particular implementation.

Server device 220 is communicatively coupled to database 240. According to an example embodiment, database 240 maintains information for training dataset 242 and unlabeled sequential data 244. Database 240 may reside in any type of storage, including volatile and non-volatile storage (e.g., random access memory (RAM), a removable or disk drive, main memory, etc.), and may be implemented by one or more logical databases. The storage on which database 240 resides may be external or internal to server device 220.

In an embodiment, each of the processes described in connection with training service 226, classifier service 222, and/or RNN 224 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
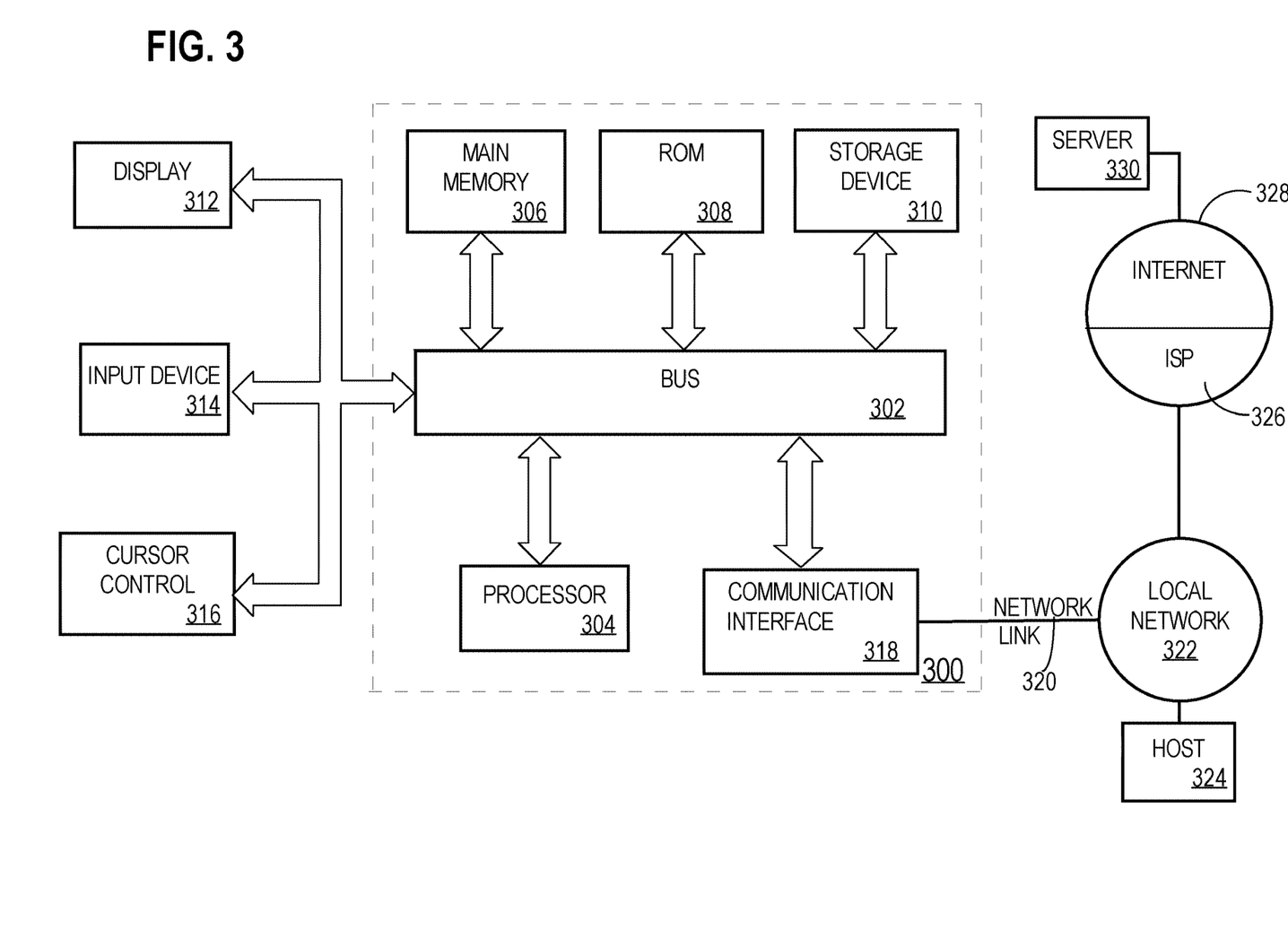
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 4:
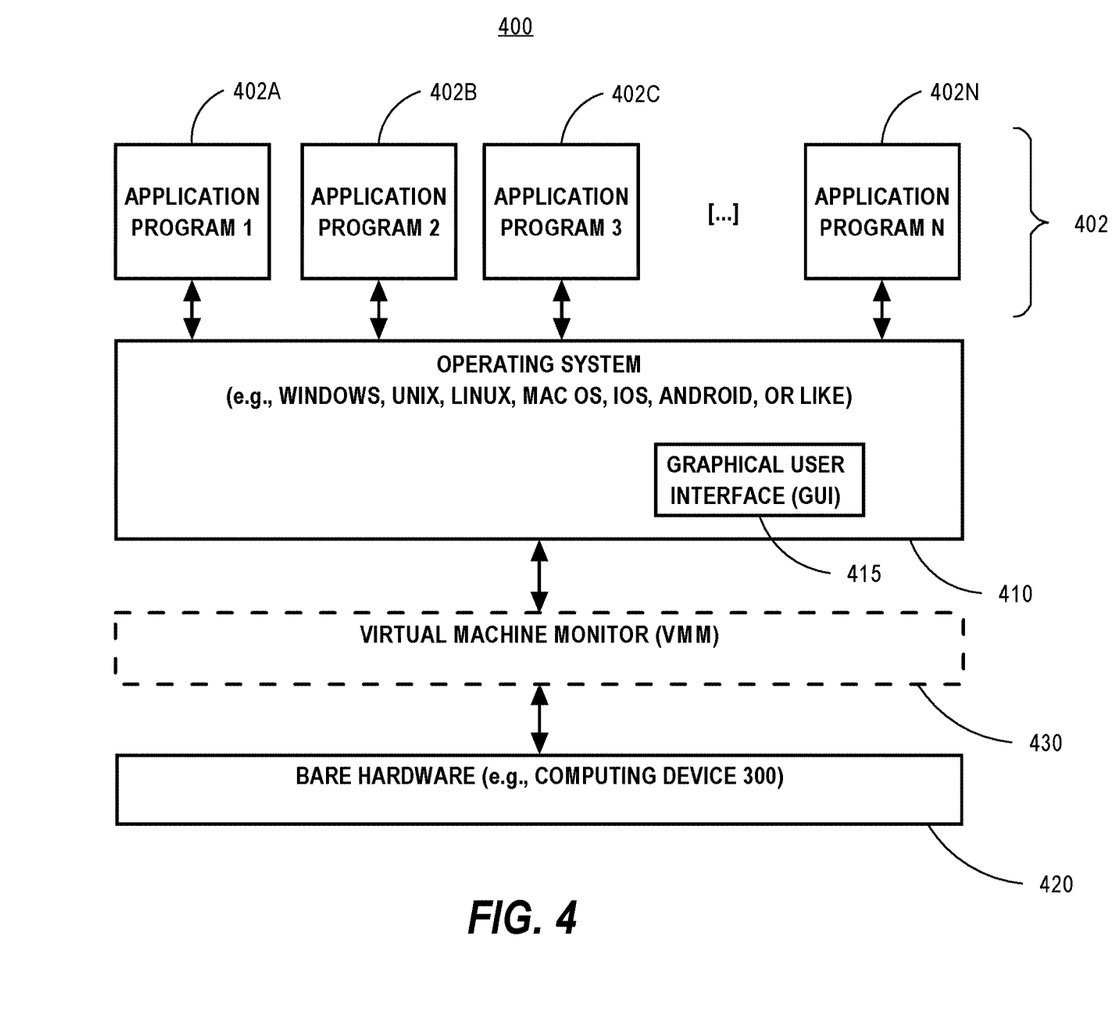
FIG. 4 is a block diagram of a basic software system that may be employed for controlling the operation of computer system.

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
   training a neural network, during a training phase of the neural network, to produce a trained neural network;
   after completing the training phase of the neural network:
      performing inference, using the trained neural network comprising a first set of weights, on a particular unlabeled input to produce a first output;
      determining whether the first output violates one or more hard constraints on output values of the trained neural network;
      in response to determining that the first output violates the one or more hard constraints on output values of the trained neural network, customizing the trained neural network to produce a customized trained neural network, the customized trained neural network being configured to produce output other than the first output from performing inference on the particular unlabeled input, by:
         customizing the first set of weights of the trained neural network by using backpropagation to adjust the first set of weights of the trained neural network to produce the customized trained neural network comprising a second set of weights,
         wherein said customizing the first set of weights of the trained neural network is configured to lower a negative energy that the trained neural network associates with the first output;
      wherein the first set of weights is different than the second set of weights;
      performing inference, using the customized trained neural network, on the particular unlabeled input to produce a second output;
      wherein the second output is different from the first output; and
   wherein the method is performed by one or more computing devices.

2. The method of claim 1, wherein using backpropagation to adjust the first set of weights of the trained neural network to produce the customized trained neural network is performed during a testing phase of the neural network.

3. The method of claim 1, further comprising, after performing inference, using the customized trained neural network, on the particular unlabeled input to produce the second output:
   determining whether the second output violates the one or more hard constraints on output values of the trained neural network;
   in response to determining that the second output violates the one or more hard constraints on output values of the trained neural network, using backpropagation to adjust the second set of weights of the customized trained neural network to produce a second customized trained neural network comprising a third set of weights;
   wherein the second customized trained neural network is configured to produce output other than the second output from performing inference on the particular unlabeled input;
   wherein the third set of weights is different than both the first set of weights and the second set of weights.

4. The method of claim 1, further comprising, after performing inference, using the customized trained neural network, on the particular unlabeled input to produce the second output:
   determining whether the second output violates the one or more hard constraints;
   in response to determining that the second output does not violate the one or more hard constraints on output values of the trained neural network, storing the second output as an inference result for the particular unlabeled input.

5. The method of claim 1, further comprising:
   performing inference, using the trained neural network comprising the first set of weights, on a second unlabeled input to produce a third output;
   determining whether the third output violates the one or more hard constraints on output values of the trained neural network;
   in response to determining that the third output violates the one or more hard constraints on output values of the trained neural network, customizing the trained neural network to produce a second customized trained neural network, the second customized trained neural network being configured to produce output other than the third output from performing inference on the second unlabeled input, by:
      customizing the first set of weights of the trained neural network by using backpropagation to adjust the first set of weights of the trained neural network to produce the second customized trained neural network comprising a third set of weights,
      wherein said customizing the first set of weights of the trained neural network is configured to lower another negative energy that the trained neural network associates with the third output;
   wherein the third set of weights is different than both the first set of weights and the second set of weights;
   performing inference, using the second customized trained neural network, on the second unlabeled input to produce a fourth output;
   wherein the fourth output is different from the third output.

6. The method of claim 1, wherein determining whether the first output violates the one or more hard constraints on output values of the trained neural network is based on a loss function that encodes the one or more hard constraints.

7. The method of claim 6, further comprising:
   receiving a definition of the one or more hard constraints; and
   automatically formulating the loss function based on the definition of the one or more hard constraints.

8. The method of claim 7, wherein the definition of the one or more hard constraints is defined using one or more of:
   context-free language; or
   regular language.

9. The method of claim 1, wherein using backpropagation to adjust the first set of weights of the trained neural network to produce the customized trained neural network further comprises:
   applying stochastic gradient descent to compute a gradient of a negative energy function to determine a set of changes to be applied to the first set of weights; and
   applying the set of changes to the first set of weights to produce the second set of weights.

10. The method of claim 1, wherein using backpropagation to adjust the first set of weights of the trained neural network comprises optimizing over energy of the first output.

11. One or more non-transitory computer-readable media storing one or more sequences of instructions that, when executed by one or more processors, cause:
   training a neural network, during a training phase of the neural network, to produce a trained neural network;
   after completing the training phase of the neural network:
      performing inference, using the trained neural network comprising a first set of weights, on a particular unlabeled input to produce a first output;
      determining whether the first output violates one or more hard constraints on output values of the trained neural network;
      in response to determining that the first output violates the one or more hard constraints on output values of the trained neural network, customizing the trained neural network to produce a customized trained neural network, the customized trained neural network being configured to produce output other than the first output from performing inference on the particular unlabeled input, by:
         customizing the first set of weights of the trained neural network by using backpropagation to adjust the first set of weights of the trained neural network to produce the customized trained neural network comprising a second set of weights,
         wherein said customizing the first set of weights of the trained neural network is configured to lower a negative energy that the trained neural network associates with the first output;
      wherein the first set of weights is different than the second set of weights;
      performing inference, using the customized trained neural network, on the particular unlabeled input to produce a second output;
      wherein the second output is different from the first output.

12. The one or more non-transitory computer-readable media of claim 11, wherein using backpropagation to adjust the first set of weights of the trained neural network to produce the customized trained neural network is performed during a testing phase of the neural network.

13. The one or more non-transitory computer-readable media of claim 11, wherein the one or more sequences of instructions further comprise instructions that, when executed by one or more processors, cause, after performing inference, using the customized trained neural network, on the particular unlabeled input to produce the second output:
   determining whether the second output violates the one or more hard constraints on output values of the trained neural network;
   in response to determining that the second output violates the one or more hard constraints on output values of the trained neural network, using backpropagation to adjust the second set of weights of the customized trained neural network to produce a second customized trained neural network comprising a third set of weights;
   wherein the second customized trained neural network is configured to produce output other than the second output from performing inference on the particular unlabeled input
   wherein the third set of weights is different than both the first set of weights and the second set of weights.

14. The one or more non-transitory computer-readable media of claim 11, wherein the one or more sequences of instructions further comprise instructions that, when executed by one or more processors, cause, after performing inference, using the customized trained neural network, on the particular unlabeled input to produce the second output:
   determining whether the second output violates the one or more hard constraints;
   in response to determining that the second output does not violate the one or more hard constraints on output values of the trained neural network, storing the second output as an inference result for the particular unlabeled input.

15. The one or more non-transitory computer-readable media of claim 11, wherein the one or more sequences of instructions further comprise instructions that, when executed by one or more processors, cause:
   performing inference, using the trained neural network comprising the first set of weights, on a second unlabeled input to produce a third output;
   determining whether the third output violates the one or more hard constraints on output values of the trained neural network;
   in response to determining that the third output violates the one or more hard constraints on output values of the trained neural network, customizing the trained neural network to produce a second customized trained neural network, the second customized trained neural network being configured to produce output other than the third output from performing inference on the second unlabeled input, by:
      customizing the first set of weights of the trained neural network by using backpropagation to adjust the first set of weights of the trained neural network to produce the second customized trained neural network comprising a third set of weights,
      wherein said customizing the first set of weights of the trained neural network is configured to lower another negative energy that the trained neural network associates with the third output;
   wherein the third set of weights is different than both the first set of weights and the second set of weights;
   performing inference, using the second customized trained neural network, on the second unlabeled input to produce a fourth output;
   wherein the fourth output is different from the third output.

16. The one or more non-transitory computer-readable media of claim 11, wherein determining whether the first output violates the one or more hard constraints on output values of the trained neural network is based on a loss function that encodes the one or more hard constraints.

17. The one or more non-transitory computer-readable media of claim 16, wherein the one or more sequences of instructions further comprise instructions that, when executed by one or more processors, cause:

receiving a definition of the one or more hard constraints; and     automatically formulating the loss function based on the definition of the one or more hard constraints.

18. The one or more non-transitory computer-readable media of claim 17, wherein the definition of the one or more hard constraints is defined using one or more of:

context-free language; or regular language.

19. The one or more non-transitory computer-readable media of claim 11, wherein using backpropagation to adjust the first set of weights of the trained neural network to produce the customized trained neural network further comprises:

applying stochastic gradient descent to compute a gradient of a negative energy function to determine a set of changes to be applied to the first set of weights; and     applying the set of changes to the first set of weights to produce the second set of weights.

20. The one or more non-transitory computer-readable media of claim 11, wherein using backpropagation to adjust the first set of weights of the trained neural network comprises optimizing over energy of the first output.

* * * * *

UNITED STATES PATENT AND TRADEMARK OFFICE
CERTIFICATE OF CORRECTION

PATENT NO. : 11,521,069 B2  
APPLICATION NO. : 15/450933  
DATED : December 6, 2022  
INVENTOR(S) : Wick et al.

Page 1 of 1

It is certified that error appears in the above-identified patent and that said Letters Patent is hereby corrected as shown below:

On the Title Page

On page 2, Column 1, Item (56) under Other Publications, Line 15, delete "acessed" and insert -- accessed --, therefor.

In the Specification

In Column 3, Line 30, delete "shi f t" and insert -- shift --, therefor.

In Column 5, Lines 17-18, delete "(s sr!" and insert -- (ssr! --, therefor.

In Column 6, Line 21, delete "3" and insert -- 3. --, therefor.

In Column 7, Line 20, delete "thereof" and insert -- thereof. --, therefor.

In Column 8, Line 3, delete "go" and insert -- g() --, therefor.

In Column 11, Line 14, delete "$\psi$" and insert -- T --, therefor.

In Column 11, Line 43, delete "a zbz" and insert -- azbz --, therefor.

In Column 15, Line 16, delete ""s sr!" and insert -- "ssr! --, therefor.

In Column 15, Line 16, delete "s srrrrrr!")" and insert -- ssrrrrrr!") --, therefor.

In the Claims

In Column 24, Line 10, in Claim 13, delete "input" and insert -- input; --, therefor.

Signed and Sealed this  
Eighth Day of August, 2023

Katherine Kelly Vidal  
*Director of the United States Patent and Trademark Office*